United States Patent
Sasabuchi et al.

(10) Patent No.: US 8,031,107 B2
(45) Date of Patent: Oct. 4, 2011

(54) OBJECT DETECTION DEVICE FOR VEHICLE AND OBJECT DETECTION METHOD FOR VEHICLE

(75) Inventors: Yoji Sasabuchi, Shioya-gun (JP); Hiroyuki Koike, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/775,887

(22) Filed: May 7, 2010

(65) Prior Publication Data
US 2010/0283663 A1 Nov. 11, 2010

(30) Foreign Application Priority Data
May 11, 2009 (JP) ................. 2009-114588

(51) Int. Cl. *G01S 13/00* (2006.01)
(52) U.S. Cl. ........... 342/70; 342/72; 342/104; 342/113; 342/158; 701/117
(58) Field of Classification Search ............. 342/70–72, 342/104, 113, 114, 158; 701/117, 120
See application file for complete search history.

(56) References Cited

U.S. PATENT DOCUMENTS

| 2001/0020201 A1* | 9/2001 | Shirai et al. ........................ 701/1 |
| 2005/0122251 A1* | 6/2005 | Shimomura ..................... 342/70 |
| 2007/0286475 A1* | 12/2007 | Sekiguchi ..................... 382/154 |

FOREIGN PATENT DOCUMENTS

| JP | 07-318652 | 12/1995 |
| JP | 08-313626 | 11/1996 |
| JP | 2004-150912 | 5/2004 |
| JP | 2007-017338 | 1/2007 |
| JP | 2009-014479 | 1/2009 |

* cited by examiner

*Primary Examiner* — Timothy A Brainard
(74) *Attorney, Agent, or Firm* — Rankin, Hill & Clark LLP

(57) ABSTRACT

An object detection device for a vehicle includes a transmitting-receiving unit, a reflection point computation unit, an object width computation unit, a representative point setting unit, a lateral relative velocity computation unit, a memory unit, and a lateral relative velocity correction unit. The transmitting-receiving unit transmits an electromagnetic wave. The object width computation unit computes a width of the object. The lateral relative velocity computation unit computes a lateral relative velocity. The memory unit records the object as a width-widening static object when the object is a static object and an amount of increase in the width of the object is greater than a predetermined value, based on a detection history of the object detected at each of the predetermined cycle. The lateral relative velocity correction unit corrects the lateral relative velocity, when the object recorded as the width-widening static object is detected at a left end part or a right end part of a detection region.

6 Claims, 3 Drawing Sheets

OBJECT DETECTION DEVICE FOR VEHICLE AND OBJECT DETECTION METHOD FOR VEHICLE

BACKGROUND OF THE INVENTION

The present application claims priority on Japanese Patent Application No. 2009-114588, filed May 11, 2009, the content of which is incorporated herein by reference.

FIELD OF THE INVENTION

The present invention relates to an object detection device for a vehicle and an object detection method for a vehicle. Conventionally, an object detection device for a vehicle is known which detects a relative position and a relative velocity of an object which exists within a predetermined detection region of a radar device transmitting an electromagnetic wave, for example. According to this object detection device for a vehicle, a position of a reflection point of the electromagnetic wave on the object is computed. Then, a position of a representative point on the object is set by a plurality of positions of the reflection points. Then, the relative position and the relative velocity of the object are detected based on a change in the position of the representative point. See, for example, Japanese Unexamined Patent Application, First Publication, No. 2009-14479 (hereinafter referred to as Patent Document 1).

According to this object detection device for a vehicle, when the object to be detected is included in the predetermined detection region of the radar device in its entirety, and then a portion of the object to be detected moves out of the predetermined detection region of the radar device, an end point of an end portion of the object which continues to be included in the predetermined detection region of the radar device is set as a position of the representative point. Therefore, before and after a portion of the object to be detected moves out from the predetermined detection region of the radar device, the relative position and the relative velocity of the object are prevented from being erroneously detected.

Incidentally, according to the object detection device for a vehicle, when the object to be detected is an object with a low reflection rate with respect to the electromagnetic wave transmitted by the radar device, the detection efficiency at the end portion of the object declines compared to the central portion of the object. Thus, even if the object exists within the predetermined detection region of the radar device, it may not be possible to detect the object in its entirety in some cases. In such cases, the detectable portions of the object tend to shrink as the object to be detected exists further from the vehicle. Accordingly, as the object in the predetermined detection region of the radar device approaches relatively to the vehicle, the portion on the object which can be detected as the position of the reflection point expands from the central portion of the object towards the end portion. Consequently, the width of the object in some cases is detected as if the width of the object tends to expand.

Meanwhile, even if the object existing in the predetermined detection region of the radar device can be detected in its entirety due to, for instance, the object being at a distance close to the vehicle, as the object approaches relatively to the vehicle, when the object gradually moves out from the predetermined detection region of the radar device, the portion on the object which can be detected as the position of the reflection point tends to shrink.

As a result, when the object approaches relatively to the vehicle, and when the expansion of the detection region due to the change in the detection efficiency based on the distance cancels out the shrinkage of the detectable region due to the object moving out from the detection region, the position of the object is detected as if the object has moved towards the central part of the detection region, even though the width of the object to be detected is constant. In this way, even though the object is actually static, the object may be erroneously detected as if the object is moving.

SUMMARY OF THE INVENTION

The present invention is made considering the problems described above. Thus, the present invention aims to provide an object detection device for a vehicle and an object detection method for a vehicle, which can accurately detect a static condition and a moving condition of an object existing outside the vehicle.

(1) Namely, an object detection device for a vehicle according to an aspect of the present invention includes a transmitting-receiving unit, a reflection point computation unit, an object width computation unit, a representative point setting unit, a lateral relative velocity computation unit, a memory unit, and a lateral relative velocity correction unit. The transmitting-receiving unit transmits an electromagnetic wave at a predetermined cycle towards a predetermined region set in front of the vehicle in a travelling direction of the vehicle. The transmitting-receiving unit also receives a reflection wave caused by the electromagnetic wave reflecting from an object. The reflection point computation unit computes each position of a plurality of reflection points on the object at which the electromagnetic wave is reflected. The object width computation unit computes a width of the object based on the positions of the reflection points computed by the reflection point computation unit. The representative point setting unit sets a position of a representative point of the object based on the positions of the reflection points computed by the reflection point computation unit. The lateral relative velocity computation unit computes a lateral relative velocity. The lateral relative velocity is a relative velocity of the object in a width direction of the vehicle. The lateral relative velocity computation unit computes the lateral relative velocity based on an amount of change in the positions of the reflection points or the position of the representative point. The memory unit records the object as a width-widening static object when the object is a static object and an amount of increase in the width of the object is greater than a predetermined value, based on a detection history of the object detected at each of the predetermined cycle. The lateral relative velocity correction unit corrects the lateral relative velocity computed by the lateral relative velocity computation unit, when the object recorded as the width-widening static object by the memory unit is detected at a left end part or a right end part of a detection region.

(2) In addition, the above object detection device for the vehicle may be configured as follows: the lateral relative velocity correction unit sets the lateral relative velocity to zero when the object is recorded as the width-widening static object by the memory unit and is detected at the left end part or the right end part of the detection region and moves in a vehicle-width direction by an amount less than or equal to a predetermined threshold.

(3) In addition, the above object detection device for the vehicle may be configured as follows: the lateral relative velocity correction unit corrects the lateral relative velocity of the object by correcting a change in the position of the reflection point or a change in the position of the representative point when the object is recorded as the width-widening static object by the memory unit and is detected at the left end part or the right end part of the detection region and moves in the vehicle-width direction by an amount greater than the predetermined threshold.

(4) By the way, an object detection method for a vehicle includes the steps of: transmitting an electromagnetic wave at a predetermined cycle towards a predetermined region set in front of the vehicle in a travelling direction of the vehicle; receiving a reflection wave caused by the electromagnetic wave reflecting from an object; computing each position of a plurality of reflection points on the object at which the electromagnetic wave is reflected; computing a width of the object based on the positions of the reflection points; setting a position of a representative point of the object based on the positions of the reflection points; computing a lateral relative velocity being a relative velocity of the object in a width direction of the vehicle based on an amount of change in the positions of the reflection points or the position of the representative point; recording the object as a width-widening static object when the object is a static object and an amount of increase in the width of the object is greater than a predetermined value, based on a detection history of the object detected at each of the predetermined cycle; and correcting the lateral relative velocity when the object recorded as the width-widening static object is detected at a left end part or a right end part of a detection region.

(5) In addition, the above object detection method may further include a step of setting the lateral relative velocity to zero when the object is recorded as the width-widening static object and is detected at the left end part or the right end part of the detection region and moves in a vehicle-width direction by an amount less than or equal to a predetermined threshold.

(6) In addition, the above object detection method may further include a step of correcting the lateral relative velocity of the object by correcting a change in the position of the reflection point or a change in the position of the representative point when the object is recorded as the width-widening static object and is detected at the left end part or the right end part of the detection region and moves in the vehicle-width direction by an amount greater than the predetermined threshold.

According to the object detection device for the vehicle described in (1) above, the lateral relative velocity of the object can be accurately detected by determining, based on the detection history of the object, whether or not the object is a width-widening static object before the object is detected in the left end part and the right end part of the detection region. The width-widening static object refers to an object such that the detection result of the width changes according to the relative distance from the vehicle, due to the detection efficiency.

According to the object detection device for the vehicle described in (2) above, the predetermined determining threshold is used to determine whether or not the amount of change in the position of the object towards the width direction of the vehicle is a value according to a change (a shrinkage, for example) in the detectable portion of the object due to the object moving out from the detection region when the object approaches relatively to the vehicle. In this way, it is possible to appropriately correct the lateral-relative velocity, which was computed from the position of the reflection point or the representative point, to zero.

According to the object detection device for the vehicle described in (3) above, even if the object which was stored in the memory part as a width-widening static object starts to move, and the amount of change in the position of the object towards the vehicle-width direction is greater than the predetermined determination threshold, the correction of the lateral relative velocity, which was conducted earlier when the amount of change in the position of the object towards the vehicle-width direction is less than or equal to the predetermined determination threshold, is halted. As a result, the lateral relative velocity is prevented from changing too rapidly.

DETAILED DESCRIPTION OF THE PREFERRED EMBODIMENTS

Hereinafter, an object detection device for a vehicle (hereinafter may be referred to as an "object detection device") according to a first embodiment of the present invention is described with reference to the attached drawings.

Figure 1:
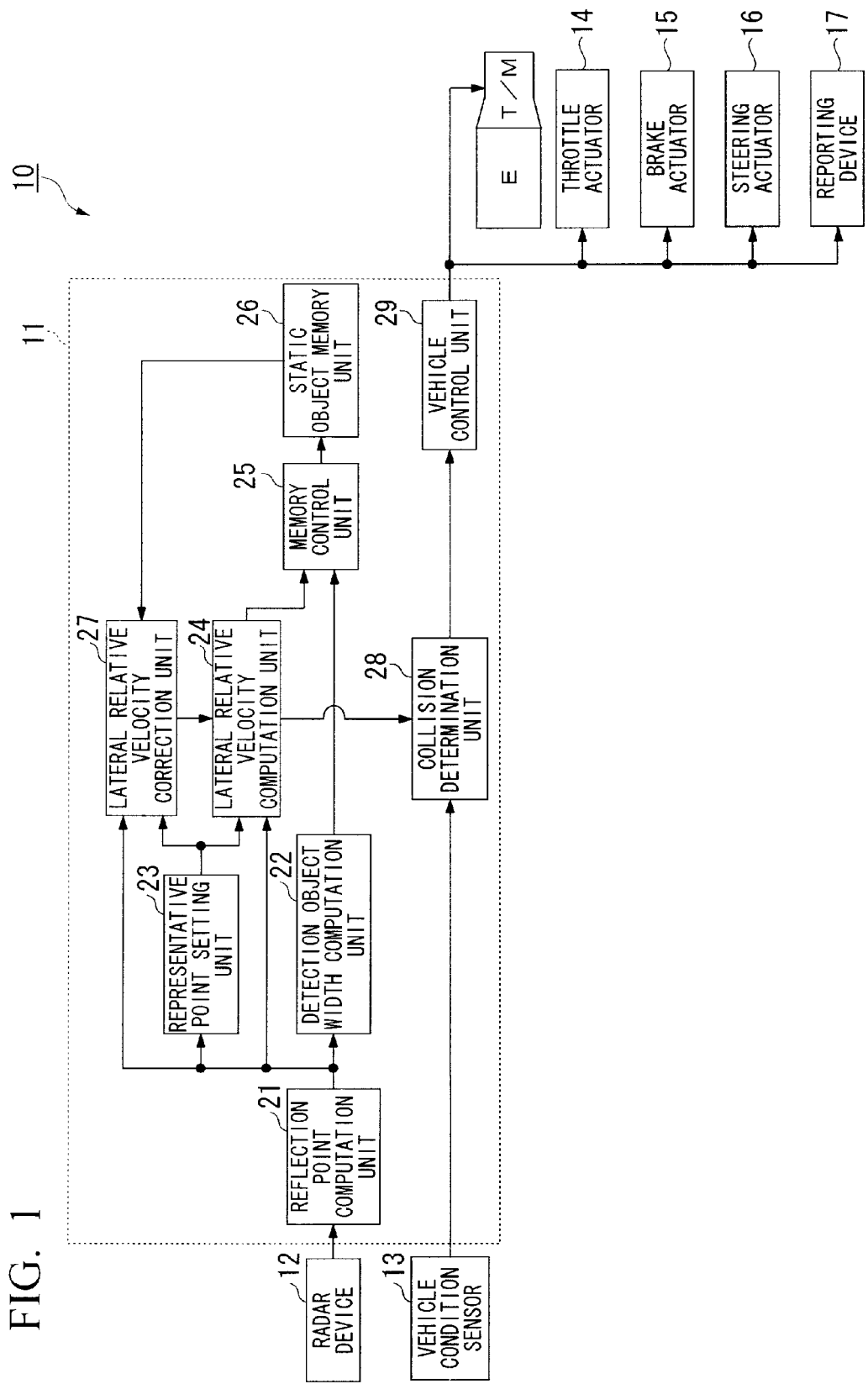
FIG. 1 is a block diagram showing a configuration of an object detection device for a vehicle according to an aspect of the present invention.

An object detection device 10 according to the present embodiment includes, as shown in FIG. 1 for example, a processing unit 11, a radar device 12, a vehicle condition sensor 13, a throttle actuator 14, a brake actuator 15, a steering actuator 16, and a reporting device 17. The processing unit 11 includes a CPU (central processing unit) which controls the object detection device 10.

For instance, the radar device 12 divides a predetermined region set outside the vehicle (a radar detection region α) into a plurality of angle regions. The radar device 12 then transmits a transmission signal of an electromagnetic wave so as to scan each angle region. The radar device 12 then receives a reflection signal caused by each transmission signal being reflected by an object outside the vehicle (for example, other vehicles or structures). Then, the radar device 12 creates a detection signal concerning a position of the reflection point and a distance from the radar device 12 to the object outside the vehicle. The radar device 12 then outputs the detection signal to the processing unit 11.

The vehicle condition sensor 13 includes, for example, a vehicle velocity sensor which detects the velocity of the vehicle, an acceleration sensor which detects the acceleration operating on the vehicle, a gyro sensor which detects the posture of the vehicle and the direction in which the vehicle is moving, a yaw rate sensor which detects the yaw rate (the rotational angular velocity of the center of gravity of the vehicle around the axis in the upper and lower direction), a position-measurement signal reception device which receives a position-measurement signal such as a GPS (Global Positioning System) signal created to measure the position of the vehicle using an artificial satellite, for instance, and various sensors which detect the operation of the driver of the vehicle. Examples of the operation of the driver include a stepping-on operation amount of an accelerator pedal, a stepping-on operation amount of a brake pedal, a rudder angle of the steering wheel, and a shifting position. Thus, the vehicle condition sensor outputs a signal indicating a detection result of various types of information regarding the vehicle.

The processing unit 11 of the object detection device for the vehicle 10 includes, for example, a reflection point computation unit 21, a detection object width computation unit 22, a representative point setting unit 23, a lateral relative velocity computation unit 24, a memory control unit 25, a static object memory unit 26, a lateral relative velocity correction unit 27, a collision determination unit 28, and a vehicle control unit 29.

The reflection point computation unit 21 computes a position of a reflection point of the electromagnetic wave which was transmitted from the radar device 12 and was reflected by a surface of an object existing outside the vehicle, based on the detection signal outputted by the radar device 12.

The detection object width computation unit 22 computes the width of the object based on the positions of a plurality of reflection points which were computed by the reflection point computation unit 21.

The representative point setting unit 23 sets a position of a representative point of an object based on the positions of a plurality of reflection points computed by the reflection point computation unit 21. Examples of the representative point include a position of a reflection point at an end part of the object, and a position of a center of gravity of the object.

The lateral relative velocity computation unit 24 computes a lateral relative velocity which corresponds to a relative velocity of the object in the vehicle width direction. The lateral relative velocity computation unit 24 carries out the computation based on the reflection point computed by the reflection point computation unit 21 or an amount in the change in the position of the representative point set by the representative point setting unit 23.

The memory control unit 25 determines whether or not the object is a static object, and whether or not the amount of increase in the width of the object is greater than or equal to a predetermined amount, according to a detection history of the object detected by the radar device 12 for each predetermined cycle. Based on this detection result, the memory control unit 25 stores the object into the static object memory unit 26 as a width-widening static object.

The lateral relative velocity correction unit 27 corrects the lateral relative velocity which is computed by the lateral relative velocity computation unit 24 when the object, which was stored in the static object memory unit 26 as a width-widening static object, is detected at a left end part or a right end part of the radar detection region α of the radar device 12. An example of the right end part is a radar detection end shown in FIG. 2.

The collision determination unit 28 determines whether or not there is a possibility that the vehicle might collide with the object. The collision determination unit 28 carries out this determination based on, for example, the signal of the detection result regarding various types of information of the vehicle outputted by the vehicle condition sensor 13, and a lateral relative velocity which was computed by the lateral relative velocity computation unit 24 or corrected by the lateral relative velocity correction unit 27.

According to the determination result of the collision determination unit 28, the vehicle controlling unit 29 outputs a controlling signal which controls the condition in which the vehicle is travelling (hereinafter, may be referred to as a "travelling condition"). Examples of this controlling signal include a controlling signal which controls the shift transmission operation by the transmission (T/M), a controlling signal which controls a driving force of the internal combustion (E) by the throttle actuator 14, a controlling signal which controls a deceleration by the brake actuator 15, and a controlling signal which controls a steering operation by the steering actuator 16.

In addition, when the vehicle controlling unit 29 informs the passenger of the vehicle of various information, the vehicle controlling unit 29 outputs a controlling signal controlling the reporting device 17.

The object detection device 10 according to the present embodiment is configured as described above. Next, an operation of this object detection device 10 is described with reference to the attached figures.

Figure 3:
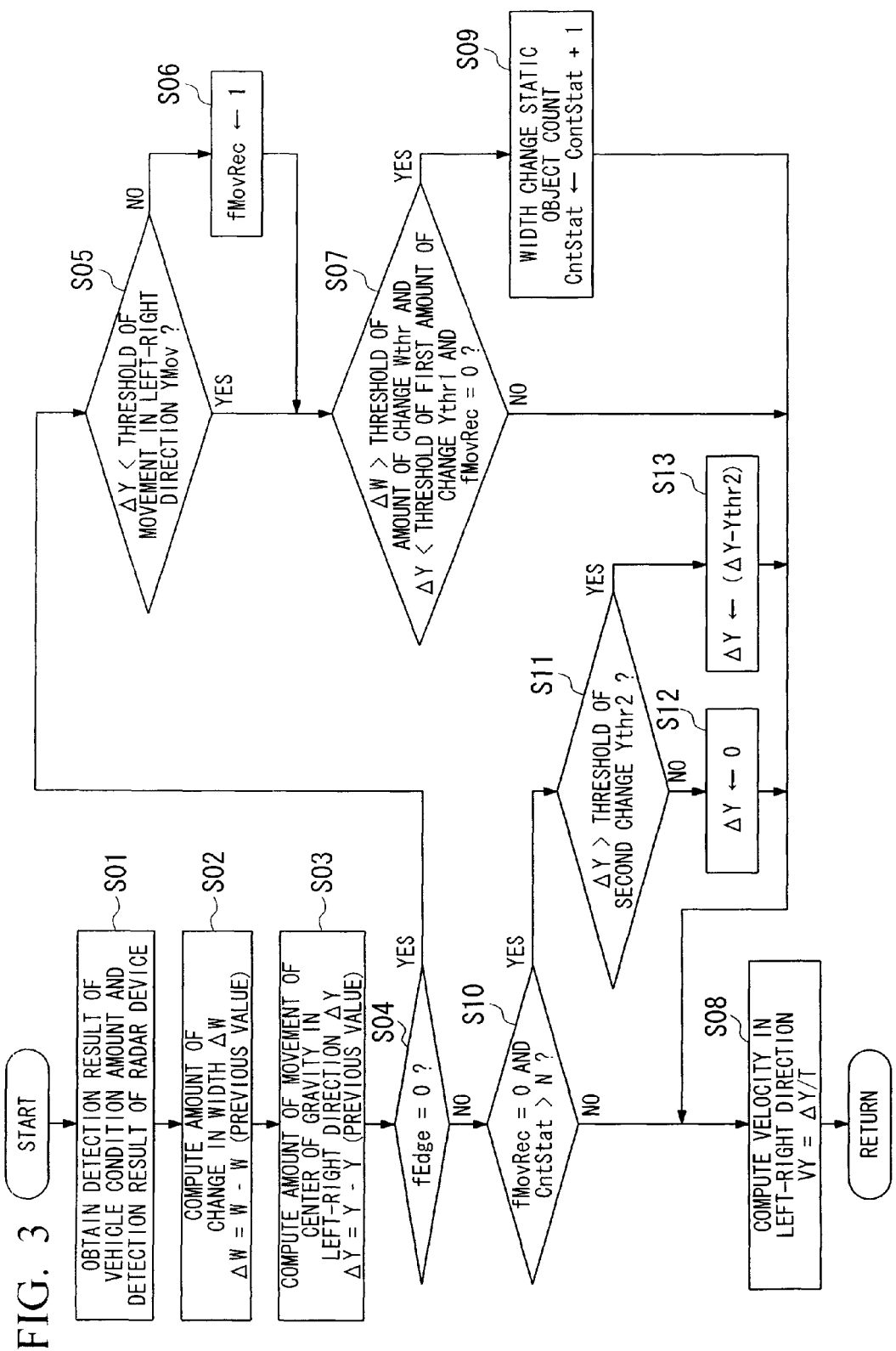
FIG. 3 is a flowchart showing an operation of an object detection device for a vehicle shown in FIG. 1.

First, in step S01, shown for example in FIG. 3, a signal of a detection result of various vehicle conditions (for instance, the position and the velocity of the vehicle) outputted by the vehicle condition sensor 13, is obtained. Furthermore, in step S01, a signal of a detection result outputted by the radar device 12 is obtained as well.

Next, in step S02, a position of a reflection point of an electromagnetic wave transmitted from the radar device 12 and reflected from a surface of the object existing outside of the vehicle is computed. Furthermore, in step S02, a width W of the object is computed based on the positions of a plurality of reflection points. In addition, in step S02, an amount of change in the width $\Delta W(=W-W \text{ (previous value)})$ is computed by a difference between a present value of the width W of the object and a previous value of the width W (previous value) of the object.

Figure 2:
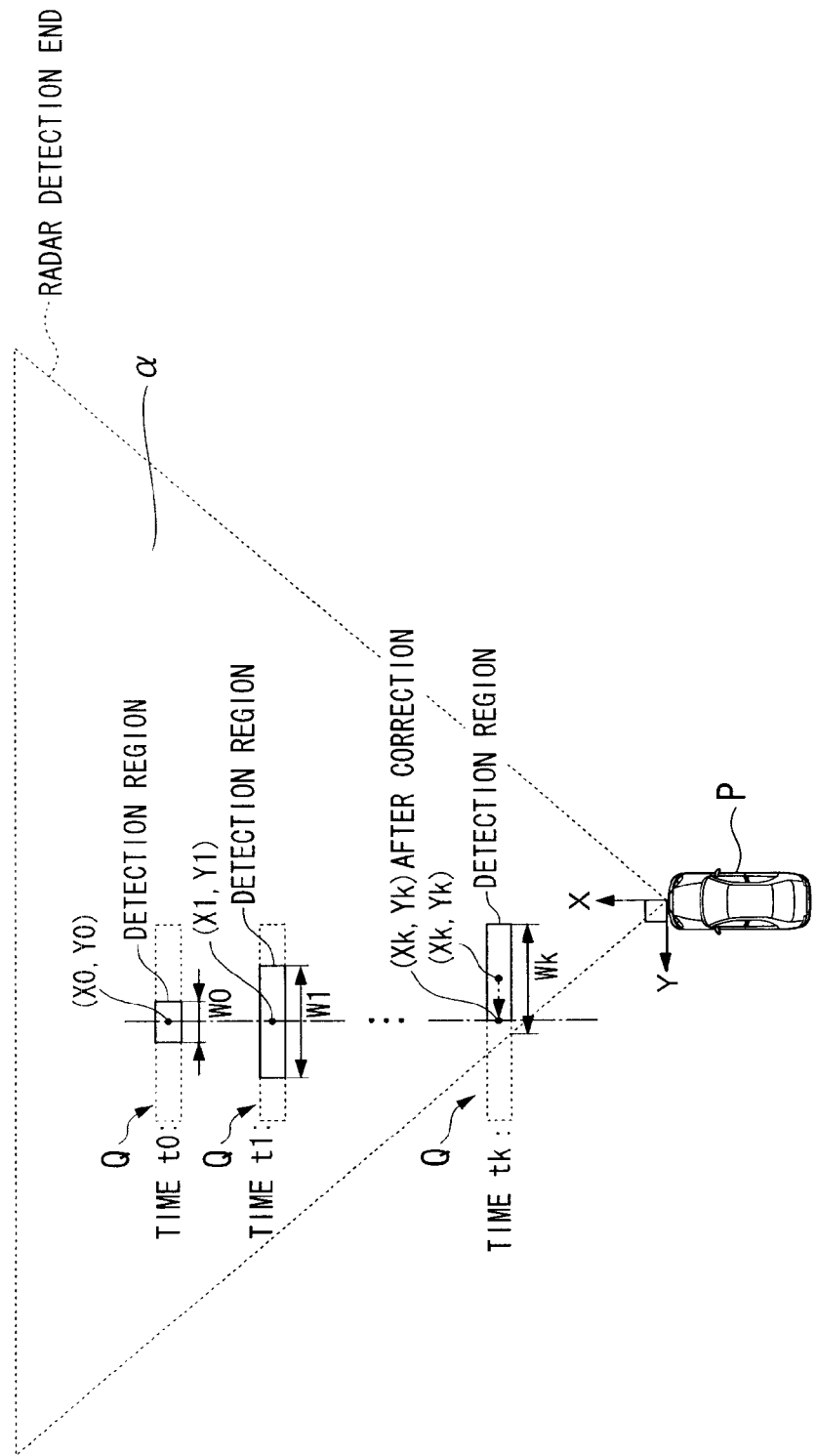
FIG. 2 represents an example of a change in a detection region of an object which is detectable by an object detection device for a vehicle shown in FIG. 1.

For example, from time t0 to time t1 shown in FIG. 2, as the object Q relatively approaches the vehicle P in the radar detection region α of the radar device 12, the detection efficiency by the radar device 12 increases at an end part side of the object Q. This increase causes the width W of the object to be detected as if the width W increases from width W0 at time t0 to width W1 at time 1. Therefore, the amount of change in the width $\Delta W$, computed at time t1, equals $\Delta W=W1-W0$.

Next, in step S03, the position of the center of gravity of the object is set as the position of the representative point, based on a plurality of positions of reflection points. Thus, in step S03, the amount of movement in the vehicle width direction, in other words, the amount of movement $\Delta Y$ of the center of gravity in the left-right direction, is computed by the difference between a previous value and a present value of a position Y of the center of gravity in the vehicle width direction (position in the left-right direction). This computation may be represented as follows: $\Delta Y=Y-Y \text{ (previous value)}$.

Next, in step S04, it is determined whether or not a flag value of a flag fEdge equals "0." The flag fEdge indicates whether the object exists at a radar detection end.

When this determination result is "NO," the object exists at the radar detection end. In this case, the routine proceeds to step S10.

On the other hand, when the determination result is "YES," the routine proceeds to step S05.

Next, in step S05, it is determined whether or not the amount of movement $\Delta Y$ of the center of gravity in the left-right direction is less than a predetermined threshold of a movement in the left-right direction YMov.

When this determination result is "YES," the routine proceeds to step S07.

On the other hand, when the determination result is "NO," the routine proceeds to step S06. A flag fMovRec indicates that there is a record that the object has moved in the vehicle width direction. In step S06, the value of the flag fMovRec is set to be "1." Then, the routine proceeds to step S07.

In step S07, it is determined whether the amount of change in the width $\Delta W$ is greater than a predetermined threshold value Wth of the amount of change, and whether the amount of movement $\Delta Y$ of the center of gravity in the left-right direction is less than a predetermined threshold Ythr1 of the first change, and whether or not the flag value of the flag fMovRec equals "0."

When the determination result is "NO," the routine proceeds to step S08. In step S08, the amount of movement ΔY of the center of gravity in the left-right direction is divided by a predetermined processing cycle T of a series of processing. Thus, the lateral relative velocity (in the left-right direction) of the vehicle VT (=ΔY/T) is computed. Then, the routine returns.

On the other hand, when the determination result is "YES," the routine proceeds to step S09. A width change static object count CntStat indicates the number of times the object was determined to be a width-widening static object. In step S09, this count CntStat is increased. Then, the routine proceeds to step S08.

In step S10, it is determined whether or not the flag value of the flag fMovRec equals "0," and whether or not the count CntStat is greater than a predetermined number N.

When this determination result is "NO," the routine proceeds to step S08 described above.

On the other hand, when this determination result is "YES," the routine proceeds to step S11.

Next, in step S11, it is determined whether or not the amount of movement ΔY of the center of gravity in the left-right direction is greater than a predetermined threshold Ythr2 of the second change.

When the determination result obtained in step S11 is "NO," the routine proceeds to step S12. In step S12, it is determined that the amount of movement ΔY of the center of gravity in the left-right direction is a value according to a shrinkage in the detectable region on the object. This shrinkage is caused by the object moving out from the radar detection end when the object relatively approached the vehicle. Thus, in step S12, it is determined that there is no actual change in the position Y of the center of gravity in the vehicle width direction (position in the left-right direction). Therefore, in step S12, the amount of movement ΔY of the center of gravity in the left-right direction is set to zero. Then, the routine proceeds to step S08.

For example, from time t1 to time tk shown in FIG. 2, a portion of the object Q moves out from the radar detection end as the object Q relatively approaches the vehicle P inside the radar detection region α of the radar device 12. As a result, the detectable region on the object is detected as if the detectable region moved in the vehicle width direction. In this case, the amount of movement ΔY of the center of gravity in the left-right direction at time tk equals ΔY=Y1−Yk(≠0).

As this time, when the amount of movement ΔY of the center of gravity in the left-right direction is less than or equal to the predetermined threshold Ythr2 of the second change, it is determined that the value of ΔY became nonzero because of a shrinkage in the detectable region on the vehicle due to the object Q moving away from the radar detection end. Thus, the amount of movement ΔY of the center of gravity in the left-right direction is corrected to zero.

On the other hand, when the determination result of step S11 is "YES," it is determined that an object which was determined to be a width-widening static object has started to move in the vehicle-width direction. Thus, an operation correcting the amount of movement ΔY of the center of gravity in the left-right direction to zero is prohibited. Furthermore, instead of using a value of the amount of movement ΔY of the center of gravity in the left-right direction at this time, the difference obtained by subtracting the predetermined threshold Ythr2 of the second change from the amount of movement ΔY of the center of gravity in the left-right direction (ΔY−Ythr2) is used as a new value for ΔY. Then, the routine proceeds to step S08 described above.

As described above, according to the object detection device 10 based on the present embodiment, before an object in the radar detection region α is detected at the radar detection end, it is determined whether or not the object is a width-widening static object according to the detection history of the object. Thus, the lateral relative velocity VT of the object can be detected accurately.

In other words, the predetermined threshold Ythr2 of the second change is used to determine whether or not the amount of movement ΔY of the center of gravity in the left-right direction is a value corresponding to a change in the detected region on the object caused by the object moving out from the radar detection region α when the object relatively approached the vehicle. Therefore, the lateral relative velocity VT of the object, computed from the position of the reflection point or the position of the representative point, can be corrected appropriately to zero.

In addition, even if the object stored as a width-widening static object starts moving at the radar detection end, and the amount of movement ΔY of the center of gravity in the left-right direction becomes greater than the predetermined threshold Ythr2 of the second change, a value obtained by subtracting the predetermined threshold Ythr2 of the second change from the amount of movement ΔY of the center of gravity in the left-right direction (ΔY−Ythr2) is set to be a new value of the amount of movement ΔY of the center of gravity in the left-right direction. Therefore, an operation of correcting the lateral relative velocity VT to zero, which was conducted earlier when the amount of movement ΔY of the center of gravity in the left-right direction was less than or equal to the predetermined threshold Ythr2 of the second change, is halted. In this way, the lateral relative velocity VT is prevented from increasing rapidly.

While a preferred embodiment of the present invention has been described above, it should be understood that these are exemplary of the invention and are not to be considered as limiting the present invention. Additions, omissions, substitutions, and other modifications can be made without departing from the spirit or scope of the present invention. The invention is not to be considered as being limited by the foregoing description, and is only limited by the scope of the appended claims.

What is claimed is:

1. An object detection device for a vehicle comprising:
   a transmitting-receiving unit transmitting an electromagnetic wave at a predetermined cycle towards a predetermined region set in front of the vehicle in a travelling direction of the vehicle, the transmitting-receiving unit also receiving a reflection wave caused by the electromagnetic wave reflecting from an object;
   a reflection point computation unit computing each position of a plurality of reflection points on the object at which the electromagnetic wave is reflected;
   an object width computation unit computing a width of the object based on the positions of the reflection points computed by the reflection point computation unit;
   a representative point setting unit setting a position of a representative point of the object based on the positions of the reflection points computed by the reflection point computation unit;
   a lateral relative velocity computation unit computing a lateral relative velocity being a relative velocity of the object in a width direction of the vehicle based on an amount of change in the positions of the reflection points or the position of the representative point;
   a memory unit recording the object as a width-widening static object when the object is a static object and an amount of increase in the width of the object is greater than a predetermined value, based on a detection history of the object detected at each of the predetermined cycle; and a lateral relative velocity correction unit correcting the lateral relative velocity computed by the lateral relative velocity computation unit, when the object recorded as the width-widening static object by the memory unit is detected at a left end part or a right end part of a detection region.

2. The object detection device for the vehicle according to claim 1, wherein the lateral relative velocity correction unit sets the lateral relative velocity to zero when the object is recorded as the width-widening static object by the memory unit and is detected at the left end part or the right end part of the detection region and moves in a vehicle-width direction by an amount less than or equal to a predetermined threshold.

3. The object detection device for the vehicle according to claim 2, wherein the lateral relative velocity correction unit corrects the lateral relative velocity of the object by correcting a change in the position of the reflection point or a change in the position of the representative point when the object is recorded as the width-widening static object by the memory unit and is detected at the left end part or the right end part of the detection region and moves in the vehicle-width direction by an amount greater than the predetermined threshold.

4. An object detection method for a vehicle, the object detection method comprising the steps of:

transmitting an electromagnetic wave at a predetermined cycle towards a predetermined region set in front of the vehicle in a travelling direction of the vehicle;

receiving a reflection wave caused by the electromagnetic wave reflecting from an object;

computing each position of a plurality of reflection points on the object at which the electromagnetic wave is reflected;

computing a width of the object based on the positions of the reflection points;

setting a position of a representative point of the object based on the positions of the reflection points;

computing a lateral relative velocity being a relative velocity of the object in a width direction of the vehicle based on an amount of change in the positions of the reflection points or the position of the representative point;

recording the object as a width-widening static object when the object is a static object and an amount of increase in the width of the object is greater than a predetermined value, based on a detection history of the object detected at each of the predetermined cycle; and correcting the lateral relative velocity when the object recorded as the width-widening static object is detected at a left end part or a right end part of a detection region.

5. The object detection method according to claim 4, further comprising a step of setting the lateral relative velocity to zero when the object is recorded as the width-widening static object and is detected at the left end part or the right end part of the detection region and moves in a vehicle-width direction by an amount less than or equal to a predetermined threshold.

6. The object detection method according to claim 5, further comprising a step of correcting the lateral relative velocity of the object by correcting a change in the position of the reflection point or a change in the position of the representative point when the object is recorded as the width-widening static object and is detected at the left end part or the right end part of the detection region and moves in the vehicle-width direction by an amount greater than the predetermined threshold.

* * * * *